Feb. 25, 1941.  L. KESSLER  2,233,134
STEREOPTICON SLIDE
Filed Dec. 10, 1938  2 Sheets-Sheet 1

INVENTOR
*Louis Kessler*
BY
*Emanuel Scheyer*
ATTORNEY

Feb. 25, 1941.   L. KESSLER   2,233,134
STEREOPTICON SLIDE
Filed Dec. 10, 1938   2 Sheets-Sheet 2
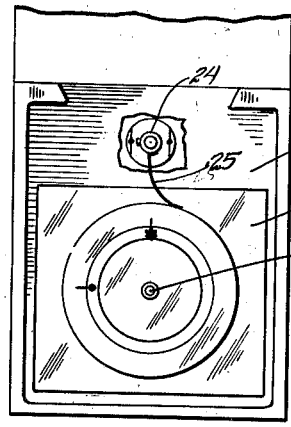
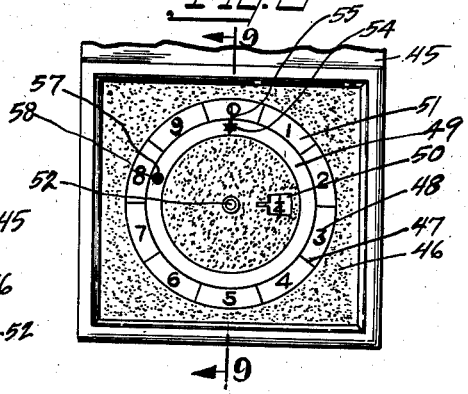
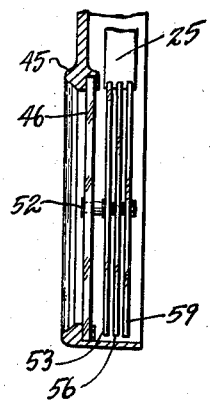
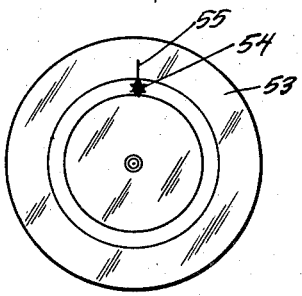
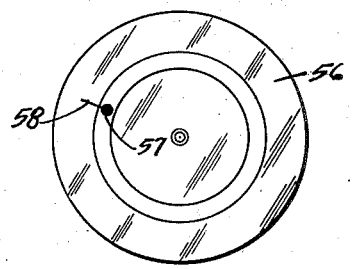
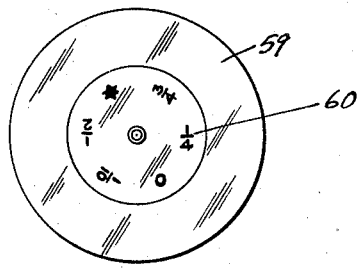
INVENTOR
Louis Kessler
BY
Emanuel Scheyer
ATTORNEY Patented Feb. 25, 1941

2,233,134

UNITED STATES PATENT OFFICE 2,233,134

STEREOPTICON SLIDE

Louis Kessler, New York, N. Y.

Application December 10, 1938, Serial No. 244,956

4 Claims. (Cl. 88—26)

This invention relates to projector or stereopticon slides and particularly concerns a slide where one or more discs suitably marked are caused to rotate and the movement indicated on a screen.

Heretofore slides of this type have been made uniformly thin so that they could be slid laterally into position in the projector from either direction. This was done especially where the slide was electrically operated, at a sacrifice to the electrical driving means. In my invention the slide is enlarged at one end to contain an electrical driving means such as a motor having a substantial size coil and pole pieces as well as an armature shaft of sufficient length to have a striker attached thereto. The driving means comes on top when my slide is mounted on the projector, said slide being inserted downward instead of sideways as heretofore. In the prior art a frame, which can hold two slides side by side, is slidably mounted on the front of the projector so that first one slide can be set in front of the light rays and then the other. Said prior art slides are made opposite hand to each other so that their indicating ends come next to each other when two of them are mounted side by side in a frame, the ends containing the driving mechanism being away from each other. With my slide where the driving mechanism is above the indicating or transparent portion of the slide when mounted on the projector, no opposite hand slides are required in case two of them are used side by side in a frame. They all fit the same way so that there is no possibility of inserting them incorrectly and having the image come out reversed or upside down on the screen as with the opposite hand slides of the prior art. The electrical driving means need not be within the casing of the slide, although this is preferable, but may be mounted outside said casing. In my mechanism, instead of, as heretofore, having the rotor of the motor directly connected to the rotating indicating disc, I use an electrically driven member which has a striker mounted thereon which striker in turn lashes the discs, so that the latter may rotate, when once struck, under their own momentum independently of the electrically driven member. This permits, in an electrically driven mechanism, a greater freedom of rotation for the discs and makes possible the independent rotation of a plurality of discs.

A further object of my invention is the provision of a stationary plate having a window or windows therein behind which marked discs rotate. In one form the stationary plate is opaque for substantially its entire extent where opposite the discs except for two windows. The windows are radially offset from each other and a disc with markings adapted to register with one window is provided as well as another disc with markings adapted to register with the other window. More windows and additional discs can be used within the scope of the invention to provide other variations of the indications projected on the screen. In another form the stationary plate is opaque but has a transparent ring containing markings and graduations. In addition to this ring the plate has another transparent ring. These transparent rings are in their broadest sense in the nature of windows.

The terms "opaque" and "transparent" as used in the specification and claims are intended to be relative only, the former letting through considerable less light than the latter.

Other objects and advantages will become apparent upon further study of the description and drawings in which:

Fig. 7 is a rear view of the bottom portion of another form of my slide, the driving mechanism being omitted except for the striker and its mounting.

Fig. 8 is a partial front elevation of the slide showing the marking on the front plate and the discs behind where they show through the front plate, said elevation being to a somewhat enlarged scale over Fig. 7.

Fig. 9 is a partial section taken along the line 9—9 of Fig. 8.

Fig. 10 is an elevation of the front marker disc of Fig. 9 shown by itself.

Fig. 11 is an elevation of the middle marker disk of Fig. 9 shown by itself, and Fig. 12 is an elevation of the rear marker disc of Fig. 9 shown by itself.

Figure 1:
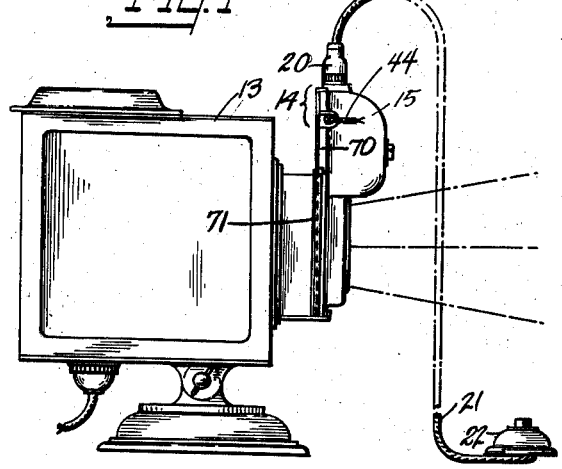
Fig. 1 is a side elevation of my slide shown in place in a projector.

The light ray projector 13 has mounted therein the stereopticon slide 14. Said slide has a housing, the upper front portion 15 of which is bulged out to provide, with a rear plate 16, an enlarged chamber 17 to hold electric motor 18. Slide 14 is mounted on projector 13 by sliding the flanges 70 of the housing down into a frame 71 slidably mounted on the front of the projector. A frame slidably mounted on the front of the projector, such as that shown at 71, is well known in the art, except that prior frames received the slides laterally instead of vertically downward as in my construction. Prior frames usually are of sufficient width to hold two slides side by side. It is evident that in my construction two slides can also be mounted side by side in a frame 71. The object of two slides in a frame, as in the prior art, is that first one slide can be brought into the path of the light from the projector and then quickly the other into said path. Slide 14 by having an enlarged chamber 17 is able to house a substantial size motor 18 or other driving means. Also mounted in said chamber is plug socket 19 adapted to receive connecting plug 20. Connected to plug 20 by cord 21 is a push button 22, said cord being connected into a power circuit, through leads 44, so that when button 22 is pressed, current is sent through motor 18. While motor 18 and plug socket 19 are preferably inside a chamber 17 they could also be mounted on the outside of the housing of slide 14 in which case it would not be necessary to provide a specially enlarged chamber.

Mounted on armature shaft 23 is a hub 24 which carries a flexible striker 25. The lower front portion of the housing of slide 14 is provided with a circular window 26 in which is mounted a clear pane of glass 27. The lower rear portion of the housing is open. A plate 28 is fastened to the bottom of the housing. Plate 16 is fastened to the upper rear portion. Both these plates overhang opening 30 at the rear of the lower portion of the housing, providing guides for holding marked slide 31. When the light of projector 13 shines through slide 31, its markings are projected through clear glass pane 27 onto the screen, the latter not being shown.

Fixed to pane 27 is a pin 32. Rotatably mounted on pin 32 are number and mark discs 33 and 34. These discs are shown with teeth on their periphery, but said teeth are not essential especially where a flexible striker, as striker 25, is used. No teeth are provided for discs 53, 56 and 59, Figs. 10, 11 and 12, as will be explained hereafter.

Marked slide 31 is opaque except for windows 38 and 39, central portion 37 and rings 40 and 41 which are transparent. Disc 33 has a ring of numerals, letters and graduations 42 at a predetermined radial distance from its axis of rotation. Window 39 is at substantially the same radial distance from said axis although a little narrower radially than ring 42, whereby the markings comprising ring 42 will appear successively at window 39 while the graduations will appear in rings 40 and 41. Disc 34 also has a ring of numerals, letters and graduations 43 which is at a lesser radial distance from its axis of rotation than that of ring 42. Window 38 is at substantially the same radial distance from said axis although a little narrower radially than ring 43 whereby the markings comprising ring 43 will appear successively at window 38 while the graduations will appear in ring 41 and central portion 37. The difference in radial distance between rings 42 and 43 is sufficiently great that they do not overlap each other.

Figure 4:
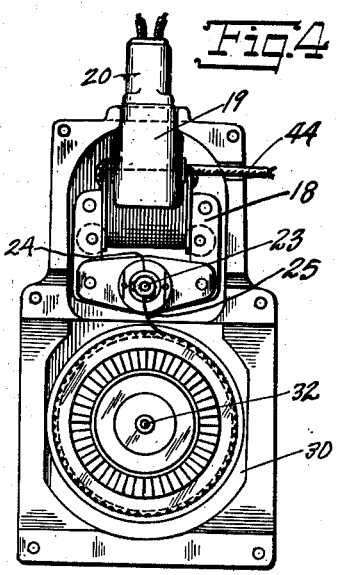
Fig. 4 is a section taken along the line 4—4 of Fig. 3, the rear marked slide being removed.
Figure 5:
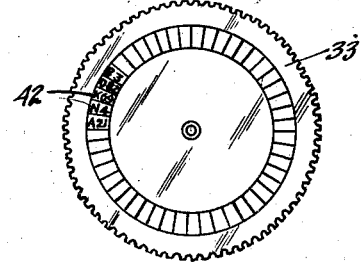
Fig. 5 is an elevation of the front number disc of Fig. 3 shown by itself.
Figure 6:
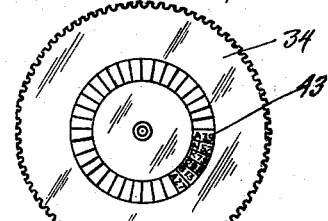
Fig. 6 is an elevation of the rear number disc of Fig. 4 shown by itself.

In playing the game, of which slide 14 is an instrument, as is the custom in screen games, the individual members of the audience of a moving picture theater are each given a card, each card having thereon a marking or combination of markings. Someone is then selected to press button 22 which is located upon the stage, connecting cord 21 being sufficiently long for this purpose. The pressing of button 22 causes motor 18 to be energized, spinning hub 24 and with it striker 25 in a clockwise direction as viewed in Fig. 4. The release of button 22, lets motor 18 stop running. As striker 25 rotates it lashes the periphery of each of discs 33 and 34 causing them to spin. When the discs stop spinning, a marking of ring 42 will appear at window 39, and a marking of ring 43 will appear at window 38. With slide 14 mounted in projector 13, the windows with the markings will appear on the screen. Those holding cards whose markings coincide with those appearing at the windows are winners. Many arrangements of markings may be used both on the discs and on the cards and the winners can be those whose card markings coincide with those shown at the windows once or a number of times. Only two windows are shown in the above game but it can be readily understood that more windows could be used providing at the same time a corresponding number of discs with complementary rings of markings are employed.

In Figs. 7-12 is shown a modification of my slide in which only one box window is shown.

Mounted in the lower portion of front wall 45 of the slide is a front plate 46. This plate is opaque except at ring 51 where the graduations 47 and numerals 48 occur, and at ring 49. There is also a transparent window 50. Fastened to plate 46, with its longitudinal axis coincident with the center of rings 49 and 51 is pivot pin 52. Rotatably mounted on pin 52 just behind plate 46 is a disc 53 having a star symbol 54 marked thereon. An index 55 forming an extension of the symbol extends radially outward from star 54. Star 54 is at such a radial distance from the longitudinal axis of pin 52, that it comes opposite ring 49 on plate 46. Rotatably mounted on pin 52 directly behind disc 53, is disc 56 having a ball symbol 57 marked thereon. An index 58 forming an extension of said symbol extends radially outward from ball 57. Ball 57 is at the same radial distance from the longitudinal axis of pin 52 as star 54, so that it also comes opposite ring 49. Rotatably mounted on pin 52 directly behind disc 56, is disc 59 having thereon a ring of markings 60. Said latter ring is at a radial distance from the longitudinal axis of pin 52, such that markings 60 may appear at window 50 of plate 46.

Figure 3:
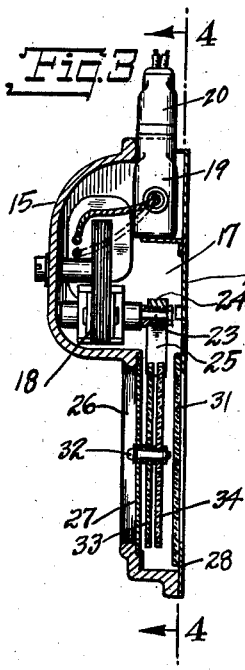
Fig. 3 is a section taken along the line 3—3 of Fig. 2.

When striker 25 lashes all three discs 53, 56 and 59 they are spun around, stopping in various positions. The action of striker 25 was explained in connection with Figs. 3 and 4. In Fig. 8 is shown, by way of example, one stopping position of the three discs after being spun. The index 58 of ball 57 comes within the box 8 on plate 46. In the playing of the game it has been announced to the audience or printed on the cards held by them that the numerals indicated by the index 58 of ball 57 is to represent tens. The index 55 of star 54 comes within the box O. It has been prearranged that the index 55 is to represent digits, so that the setting of the discs shown in Fig. 8 represents the number 80. The holders of the cards having this number make note thereof. Successive spinnings of discs 53 and 56 indicate further numbers which are noted by the holders of the proper cards until one or more such holders have the requisite arrangement of numbers to win. By using more discs with symbols thereon, numbers with a greater number of places than two can be indicated, the various symbols being assigned to correspond to predetermined places in the number. Many combinations of the numerals indicated by the symbols may be made other than assigning them to places in a number, such as adding together the numerals indicated. Also each of the discs or some of them may have upon them more than one symbol.

During all this time no attention was paid to the showing of disc 59 at window 50. The winning card having been selected, the discs are given another spin by pressing the control button, this time attention being paid to the showing of disc 59 at window 50 and not to the others. According to a prearranged schedule the symbol appearing at window 50 denotes the prize. In Fig. 8, the fraction ¼ appears. This could mean that the winner is to receive ¼ of the total cash award for the evening.

Figure 2:
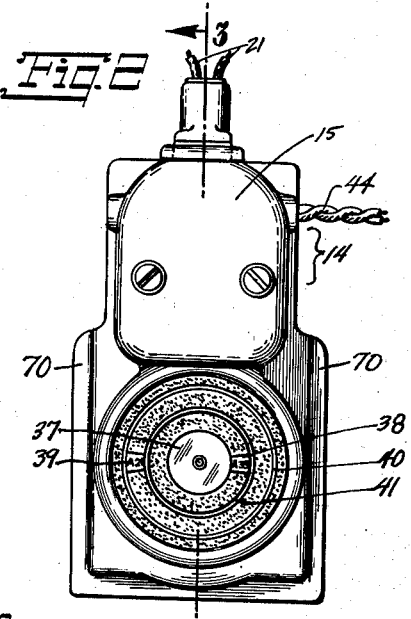
Fig. 2 is a front elevation of the slide, the markings on the rear slide being seen through the front clear glass pane.

The windows 38 and 39 in Fig. 2 could also be used to indicate tens and digits, discs 33 and 34 being numbered from 0 to 9.

The term "box window" as used in the claim means an opening or substantially transparent area of irregular, circular or polygonal shape, said area being in a part having areas surrounding the window which are opaque or resistant to the passage of light. The windows 38, 39 and 50 are examples of box windows.

I claim:

1. A slide apparatus, adapted to be used in a projection machine, comprising an elongated casing divided into an upper enlarged section opening into a lower narrow section, said lower section being provided with opposed light inlet and outlet openings, at least two transparent discs provided in spaced parallel relation between the planes of said openings and each disc having a plurality of indicia on a face thereof, means wholly within said narrow section for rotatably supporting said discs, an impelling device for said discs consisting of solely one flexible strip, means for rotating said strip about one end thereof, said rotating means comprising an electrical motor located completely within said enlarged section directly above said discs and being provided with an armature shaft, said shaft additionally being located wholly within said enlarged section, said one end of the strip being directly secured to said shaft, and said shaft being arranged substantially parallel to the axis of rotation of said discs, said strip being of a length such that it acts as a direct driving coupling between said shaft and discs whereby rotation of said strip causes the latter to lash said disc peripheries and produce rotation of said discs.

2. A slide apparatus, adapted to be used in a projection machine, comprising a casing having a lower restricted section opening into an upper enlarged section, at least one transparent disc provided in said lower section, said lower section having opposed light inlet and outlet openings, means arranged axially of said openings for supporting the said disc in spaced, parallel relation to said openings whereby light is readily transmitted through said disc, said disc having indicia thereon to be projected, an electrical motor device located wholly within said enlarged section and having a rotatable armature located wholly within said enlarged section, a flexible strip having one end thereof mechanically coupled to said armature whereby the strip is rotated about said end upon energization of said electrical device, said strip being sufficiently long to permit its opposite end to strike said disc periphery thereby to provide a direct mechanical driving coupling between said armature and disc whereby upon rotation of the strip said disc is lashed into rotation.

3. In a slide structure, adapted for use in a projection machine, a casing having a restricted section opening into an enlarged section, said restricted section being provided with a pair of opposed light-transmission openings, at least one rotatable transparent disc positioned between said openings in spaced relation thereto, a support pin positioned at the axis of said openings supporting said disc in parallel to the plane of said openings whereby light readily passes through the disc, said disc being provided with markings on one face thereof, the axis of rotation of said disc being normal to the planes of said openings, an electrical motor located completely within said enlarged section, said motor having a shaft located wholly within said enlarged section, a flexible disc lashing strip having one end adapted to contact the disc periphery thereby to provide a direct driving connection between said shaft and disc, the opposite end of said strip being directly affixed to said shaft for rotation of the strip about said opposite end upon energization of the motor.

4. A slide structure, adapted for use in a projection machine, comprising a casing having a lower narrow section opening into an upper enlarged section, said lower section having opposed light-transmission openings, an opaque plate fixed in one of said openings, said plate being provided with at least one light-transmission area, at least one transparent disc positioned between said openings, means supporting said disc for rotation about an axis normal to the plane of said plate, said disc having markings adapted to register with said area, an electric motor disposed wholly within said upper section and having a rotatable shaft wholly within said upper section which is parallel to said disc axis of rotation, a flexible striker strip having one end located adjacent said disc periodically to strike the disc periphery, said strip having its other end directly affixed to said shaft whereby energization of the motor causes rotation of said strip and results in the latter lashing said disc into rotation.

LOUIS KESSLER.